United States Patent
Kawamoto (10) Patent No.: US 8,314,878 B2
(45) Date of Patent: Nov. 20, 2012

(54) IMAGE PICKUP APPARATUS WITH IMPACT RESISTANCE

(75) Inventor: Hisashi Kawamoto, Chiba (JP)

(73) Assignee: Seiko Precision Inc., Narashino-shi (JP)

( * ) Notice: Subject to any disclaimer, the term of this patent is extended or adjusted under 35 U.S.C. 154(b) by 343 days.

(21) Appl. No.: 12/366,905

(22) Filed: Feb. 6, 2009

(65) Prior Publication Data

US 2009/0141161 A1   Jun. 4, 2009

Related U.S. Application Data (63) Continuation of application No. PCT/JP2007/073950, filed on Dec. 12, 2007.

(30) Foreign Application Priority Data

Dec. 21, 2006   (JP) .................................. 2006-344966

(51) Int. Cl.
*H04N 5/225* (2006.01)
(52) U.S. Cl. ....................................................... 348/340
(58) Field of Classification Search .................... 348/340
See application file for complete search history.

(56) References Cited

U.S. PATENT DOCUMENTS

| | | | | |
|---|---|---|---|---|
| 6,169,578 | B1* | 1/2001 | Chigira | 348/347 |
| 6,225,614 | B1* | 5/2001 | Ono | 250/201.5 |
| 7,340,161 | B2* | 3/2008 | Asai et al. | 396/89 |
| 2005/0140817 | A1* | 6/2005 | Hasuda | 348/360 |
| 2006/0006239 | A1* | 1/2006 | Tanaka | 235/472.01 |
| 2006/0016280 | A1* | 1/2006 | Hasegawa et al. | 74/89.23 |
| 2006/0055787 | A1* | 3/2006 | Hirota et al. | 348/208.5 |
| 2006/0062100 | A1* | 3/2006 | Takahashi et al. | 369/44.11 |
| 2006/0103758 | A1* | 5/2006 | Yoon et al. | 348/374 |
| 2006/0239671 | A1* | 10/2006 | Shiraishi et al. | 396/89 |
| 2008/0279546 | A1* | 11/2008 | Taniguchi | 396/508 |
| 2009/0051774 | A1* | 2/2009 | Shiraishi | 348/207.99 |

(Continued)

FOREIGN PATENT DOCUMENTS

JP   3-83456   4/1991

(Continued)

OTHER PUBLICATIONS

International Search Report for International Application No. PCT/JP2007/073950 dated Mar. 4, 2008.

(Continued)

*Primary Examiner* — Jason Chan
*Assistant Examiner* — Cynthia Segura
(74) *Attorney, Agent, or Firm* — Kratz, Quintos & Hanson, LLP

(57) ABSTRACT

An image pickup apparatus includes: an image pickup substrate on which an image pickup device is mounted on an object side; an optical unit having a lens for imaging an object light on the image pickup device; a blade member adjusting an amount of the object light entering into the lens; a drive unit having a motor driving the blade member; and a motor substrate supplying the motor with a drive power. The optical unit is provided in the image pickup substrate. The drive unit is provided in the optical unit so as to be spaced apart from the image pickup substrate. The motor substrate is provided in the drive unit so as to face the image pickup substrate. The conductive member electrically connecting the image pickup substrate with the motor substrate is disposed between the image pickup substrate and the motor substrate.

4 Claims, 10 Drawing Sheets

U.S. PATENT DOCUMENTS

2009/0213232 A1* 8/2009 Asakura et al. ............ 348/208.4
2012/0146171 A1* 6/2012 Kosaka et al. ................ 257/432

FOREIGN PATENT DOCUMENTS

| | | |
|---|---|---|
| JP | 2006-039492 | 2/2006 |
| JP | 2006-58644 A1 | 3/2006 |
| JP | 2006-64769 A1 | 3/2006 |
| JP | 2006-67121 A1 | 3/2006 |
| JP | 2006-276763 | 10/2006 |
| JP | 2006-311358 A1 | 11/2006 |
| JP | 2006-333432 A1 | 12/2006 |
| WO | WO 2006/088051 A1 | 8/2006 |
| WO | WO 2006106953 A1 * | 10/2006 |

OTHER PUBLICATIONS

Office Action issued on Dec. 14, 2010 in the corresponding Japanese Patent Application No. 2006-344966 (see, Notification of Reasons(s) for Refusal) with English translation.

Office Action issued on Jan. 18, 2011 in the corresponding Korean Patent Application No. 10-2009-7002762 with English translation.

Japanese Notification of Reasons of Refusal with English translation mailed Mar. 25, 2011 (6 pages).

Decision of Refusal received from the Korean Intellectual Property Office in counterpart application No. 10-2009-7002762 dated Aug. 22, 2011 with English translation (6 pages).

* cited by examiner

IMAGE PICKUP APPARATUS WITH IMPACT RESISTANCE

CROSS-REFERENCE TO RELATED APPLICATION

This application is a continuation of and claims priority to International Patent Application No. PCT/JP2007/073950 filed on Dec. 12, 2007, which claims priority to Japanese Patent Application No. 2006-344966 filed on Dec. 21, 2006, subject matter of these patent documents is incorporated by reference herein in its entirety.

BACKGROUND OF THE INVENTION

1. Field of the Invention

The present invention relates to an image pickup apparatus.

2. Description of the Related Art

A generally conventional image pickup apparatus includes a blade arranged between an optical unit having a lens and an image pickup unit having an image pickup device. In order to move the blade, the image pickup apparatus includes a blade drive unit including a substrate supporting the blade and a drive source such as step motor. Lately, a camera for a mobile telephone is equipped with an AF (autofocus) mechanism, a zoom mechanism, a shutter mechanism, and an image stabilizer mechanism, in addition to a camera equipped with a fixed-focus mechanism. This needs the electric connection between a base material and a drive unit which includes a drive source, such as a step motor driving each mechanism serving as a controlled portion.

Figure 10:
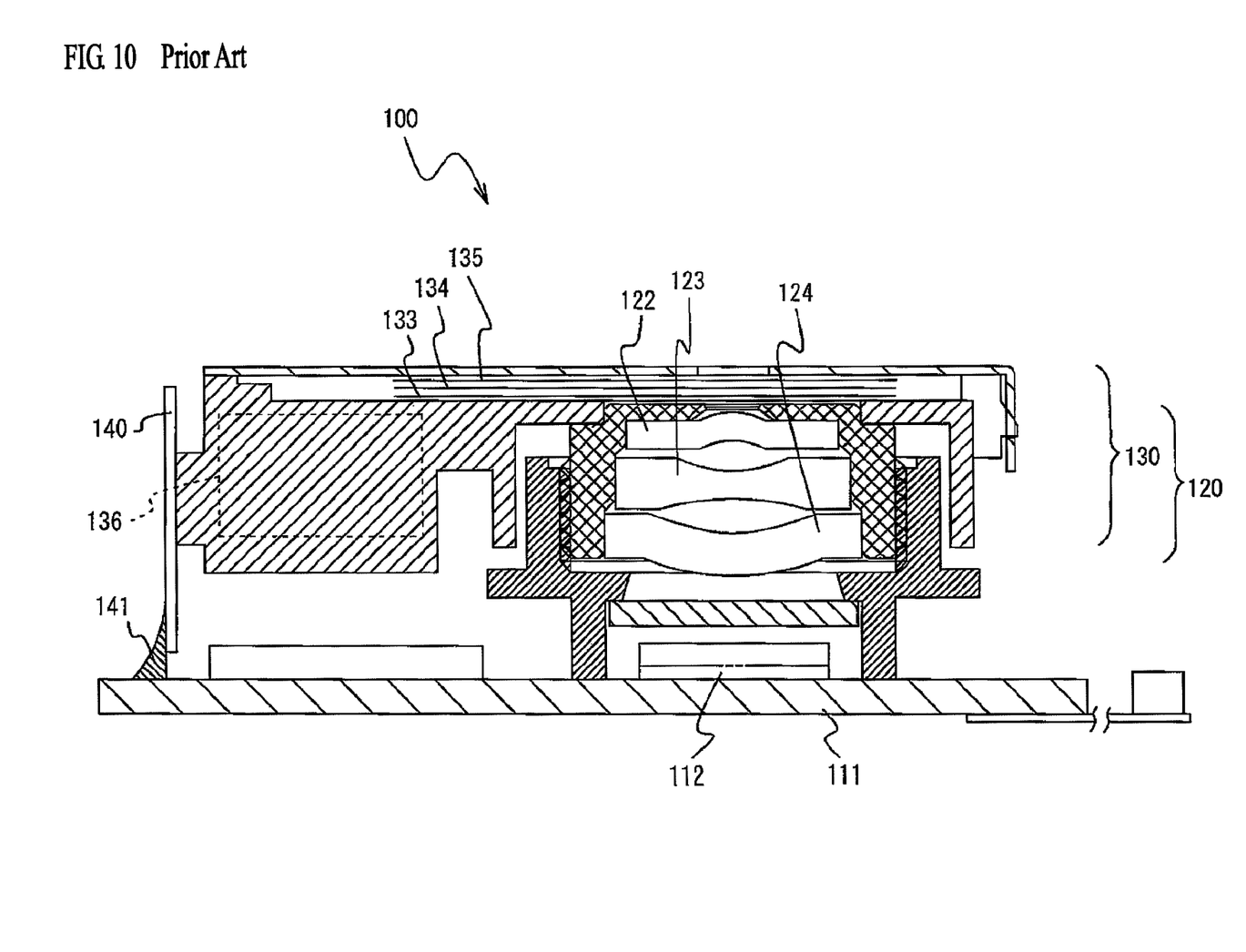
FIG. 10 is a side view of a conventional image pickup apparatus to show the inside thereof.

For example, as shown in FIG. 10, an image pickup apparatus 100 disclosed in Document 1 (Japanese Unexamined Patent Application Publication No. 2006-58644) includes: a image pickup substrate 111 on which an image pickup device 112 is mounted on an object side; an optical unit 120 having lenses 122, 123, and 124 for imaging an object light on the image pickup device 112; blades 133, 134 and 135 adjusting the amount of the object light entering into the lenses 122, 123, and 124; a blade drive unit 130 having a step motor 136 serving as a drive source for the blades 133, 134, and 135; and a print substrate 140 supplying the step motor 136 with a drive power from the image pickup substrate 111.

In the image pickup apparatus 100 disclosed in Document 1, this print substrate 140 is electrically connected with the image pickup substrate 111 by a solder 141, and the print substrate 140 is fixed to be substantially perpendicular to the image pickup substrate 111. Thus, the blade drive unit 130 is electrically connected with the image pickup substrate 111 and is securely supported by the image pickup substrate 111 via the print substrate 140 made of a hard material. As described above, the blade drive unit 130 is stably supported by the image pickup substrate 111, so that the image pickup apparatus 100 has a good impact resistance and a structure in which a load caused inside thereof can be reduced.

However, in the image pickup apparatus 100 disclosed in Document 1, the print substrate 140 made of a hard material and having rigidity is needed, and the print substrate 140 has to be securely jointed with the blade drive unit 130. Additionally, an end portion of the print substrate 140 and the image pickup substrate 111 are soldered to be faced with each other, and the solder 141 is concentrically loaded from the end portion of the print substrate 140 in the optical axis direction, when the impact is applied. Thus, the connection between the solder 141 and the print substrate 140 may be cut by a shear stress caused between the print substrate 140 and the solder 141 in the optical axis direction. Further, since the solder 141 which electrically connects the print substrate 140 is disposed on an end portion of the image pickup substrate 111, the image pickup substrate 111 is larger in the longitudinal direction thereof. Thus, the image pickup substrate 111 cannot be downsized, as a result, there is the problem in which the image pickup apparatus 100 cannot be further downsized.

SUMMARY OF THE INVENTION

It is therefore an object of the present invention to provide an image pickup apparatus which has a good impact resistance and has a smaller size.

According to an aspect of the present invention, there is provided an image pickup apparatus including: an image pickup substrate on which an image pickup device is mounted on an object side; an optical unit having a lens for imaging an object light on the image pickup device; a blade member adjusting an amount of the object light entering into the lens; a drive unit having a motor driving the blade member; and a motor substrate supplying the motor with a drive power, wherein the optical unit is provided in the image pickup substrate, the drive unit is provided in the optical unit so as to be spaced apart from the image pickup substrate; the motor substrate is provided in the drive unit so as to face the image pickup substrate; and a conductive member electrically connecting the image pickup substrate with the motor substrate is disposed between the image pickup substrate and the motor substrate.

With such a configuration, the motor substrate is stably held by the drive unit via a broad contact area so as to face the image pickup substrate. Then, the conductive member, which electrically connects the image pickup substrate with the motor substrate, is disposed between the image pickup substrate and the motor substrate. Therefore, the conductive member, on the image pickup substrate, needed for the electric connection between the image pickup substrate and the motor substrate, is rarely affected by the concentration of stress from an end portion of the motor substrate in the optical axis direction, when the impact is applied. That is to say, since boundary faces of the motor substrate and the conductive member are perpendicular to the optical axis, the boundary faces serve to cushion a load applied in the optical axis direction. This suppresses the shear stress generated among the motor substrate, the conductive member, and the image pickup substrate. This prevents the electrical disconnection of the motor substrate and the image pickup substrate, and maintains the electrical connection. The conductive member is disposed between the image pickup substrate and the motor substrate, thereby downsizing a space for disposing the conductive member. Additionally, a contact area of the conductive member is increased without increasing the outer size of the image pickup apparatus, thereby securely maintaining the electrical connection. Thus, the impact resistance can be enhanced and the image pickup substrate can be downsized. Therefore, the whole of the image pickup apparatus can be downsized.

According to a second aspect of the present invention, there is provided an image pickup apparatus including: an image pickup substrate on which an image pickup device is mounted on an object side; an optical unit having a lens imaging an object light on the image pickup device; a drive unit having a motor driving the lens in a optical axis direction or in a direction perpendicular to the optical axis; and a motor substrate supplying the motor with a drive power, wherein the optical unit is provided in the image pickup substrate, the drive unit is provided in the optical unit so as to be spaced apart from the image pickup substrate; the motor substrate is provided in the drive unit so as to face the image pickup substrate; and a conductive member electrically connecting the image pickup substrate with the motor substrate is disposed between the image pickup substrate and the motor substrate.

With such a configuration, the motor substrate is stably held by the drive unit via a broad contact area so as to face the image apparatus substrate. Then, the conductive member, which electrically connects the image pickup substrate with the motor substrate, is disposed between the image pickup substrate and the motor substrate. Therefore, the conductive member, on the image pickup substrate, needed for the electric connection between the image pickup substrate and the motor substrate, is rarely affected by the concentration of stress from an end portion of the motor substrate in the optical axis direction, when the impact is applied. That is to say, since boundary faces of the motor substrate and the conductive member are perpendicular to the optical axis, the boundary faces serve to cushion a load applied in the optical axis direction. This suppresses the shear stress generated among the motor substrate, the conductive member, and the image pickup substrate. This prevents the electrical disconnection of the motor substrate and the image pickup substrate, and maintains the electrical connection. The conductive member is disposed between the image pickup substrate and the motor substrate, thereby downsizing a space for disposing the conductive member. Additionally, a contact area of the conductive member is increased without increasing the outer size of the image pickup apparatus, thereby securely maintaining the electrical connection. Thus, the impact resistance can be enhanced and the image pickup substrate can be downsized. Therefore, the whole of the image pickup apparatus can be downsized.

BRIEF DESCRIPTION OF THE DRAWINGS

Preferred embodiments of the present invention will be described in detail with reference to the following drawings, wherein:

FIGS. 5A and 5B are views showing the image pickup apparatus when the blades are fully opened.

FIGS. 6A and 6B are views showing the image pickup apparatus when the blades are in small aperture.

DESCRIPTION OF THE PREFERRED EMBODIMENTS (First Embodiment)

Figure 1:
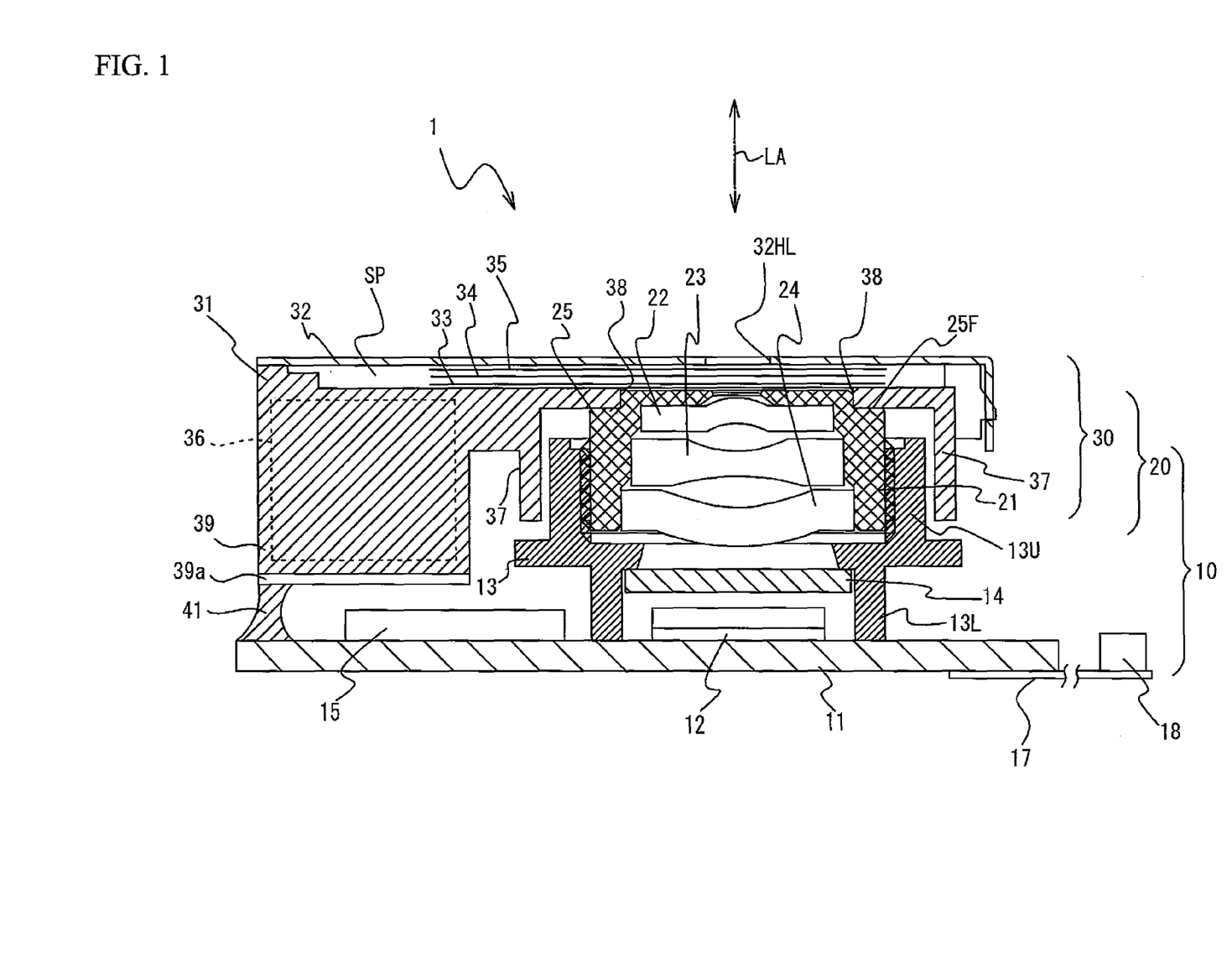
FIG. 1 is a side view of an image pickup apparatus 1 to show the inside thereof.

A description will now be given, with reference to the accompanying drawings, of a first embodiment of the present invention. FIG. 1 is a side view of an image pickup apparatus 1 to show the inside thereof. The image pickup apparatus 1 includes three main units. That is, the image pickup apparatus 1 includes an image pickup unit 10 having an image pickup device 12 therein, an optical unit 20 having lenses 22, 23 and 24, and a blade drive unit 30 being a drive unit that drives the blade 33, 34 and 35. Referring to FIG. 1, the image pickup unit 10, the optical unit 20, and the blade drive unit 30 are piled up in this order in the image pickup apparatus 1. The aforementioned three units are provided to partially overlap each other in upper and lower portions thereof. The image pickup unit 10 and the optical unit 20 are herein referred to as an image pickup optical module.

The image pickup unit 10 includes an image pickup substrate 11, an image pickup device 12, and an optical filter 14. The image pickup device 12 is an image sensor such as a CCD, CMOS, or the like, and is fixed onto a given position of the image pickup substrate 11. A lens barrel 13 serving as a part of the optical unit 20 is substantially tube-shaped, and is fixed onto the image pickup substrate 11 to surround an outer circumference of the image pickup device 12. The optical filter 14 such as an IR cut filter or the like is arranged in a lower portion 13L of the lens barrel 13. In addition, an upper portion 13U of the lens barrel 13 is engaged with a portion of the optical unit 20 and that of the blade drive unit 30, as will be described later. A FPC (Flexible Printed Circuit) 17 is provided for connecting the electronics apparatus such as a camera, mobile telephone, or the like, and is connected to a wiring pattern, not shown, formed on the image pickup substrate 11. Also, the FPC 17 is equipped with a connector 18 so as to establish connection with a main circuit board (motherboard) or the like provided on the electronics apparatus.

A lens holder 21, which is included in the optical unit 20, is fitted into the upper portion 13U of the lens barrel 13. Three lenses 22, 23, and 24 are held inside the lens holder 21. A screw is provided so that the surface of the outer circumference of the lens holder 21 and the surface of the inner circumference of the upper portion 13U of the lens barrel 13 can be screwed together. Therefore, the lens holder 21 is rotated against the lens barrel 13 to change the position in an optical axis direction LA for the focus adjustment so that an incoming light can be focused onto the image pickup device 12 through the lenses 22, 23, and 24. After the focus adjustment is completed, the lens holder 21 is fixed into the lens barrel 13 with an adhesive agent. As mentioned heretofore, the lens barrel 13 and the lens holder 21 included in the optical unit 20 are provided on the image pickup substrate 11.

A cut out portion 25, in which the circumference is cut out in a stepwise manner, is formed at an upper end (an end on the object side) of the lens holder 21. The cut out portion 25 includes an annular surface 25F perpendicular to the optical axis direction LA. A blade substrate 31 of the drive unit 30 is contact with the annular surface 25F.

The blade drive unit 30 is arranged at the upper portion of the optical unit 20. Generally, the blade drive unit 30 includes a device named a blade drive device or a shutter device. The blade drive unit 30 is arranged closer to the object than to the optical unit 20 in the image pickup apparatus 1 embodying the present invention. More specifically, the blade substrate 31 included in the blade drive unit 30 is partially fixed onto the lens holder 21 of the optical unit 20. A blade supporting plate 32 is arranged to face the blade substrate 31. Three pieces of the blades 33, 34, and 35 are interposed in a blade arrangement space SP between the blade substrate 31 and the blade supporting plate 32.

The blade substrate 31 includes a cylinder portion 37 and a motor housing portion 39. The cylinder portion 37 is formed to contact with the lens holder 21 and cover the upper portion 13U of the lens barrel 13. The motor housing portion 39 includes the step motor 36 serving as an actuator. A shutter opening 38 is provided in the blade substrate 31. The blade substrate 31 is mechanically connected to the lens holder 21 at the above-mentioned cut out portion 25. An inner peripheral surface of the shutter opening 38 of the blade substrate 31 is fixed to contact with the outer peripheral surface of the cut out portion 25. The blade substrate 31 and the lens holder 21 are mechanically connected with each other, thereby preventing a misalignment between the blade substrate 31 and the lens holder 21 in a direction perpendicular to the optical axis direction. This also prevents a misalignment between the optical axis of the lenses 22, 23 and 24 and the center of the shutter opening 38.

The blade substrate 31 includes a portion, on which the shutter opening 38 is formed, and which has a shape of plane plate perpendicular to the optical axis LA. Accordingly, an annular surface 25F of the cut out portion 25 and a cylinder portion 37 of the blade substrate 31 are brought into contact with each other, and the blade substrate 31 is fixed perpendicularly to the optical axis direction LA.

Additionally, the cut out portion 25 of the lens holder 21 is configured to include a step having a cross-section of a right angle and the shutter opening 38 is configured to fit with the cut out portion 25. This makes it possible to fit the blade substrate 31 and the lens holder 21 with higher accuracy.

The lens holder 21 is fixed inside the lens barrel 13, as described. The shutter opening 38 of the blade substrate 31 is fit with the lens holder 21. Therefore, the relative positions of the lenses 22 through 24 in the optical unit 20 and the blade drive unit 30 do not vary in the image pickup apparatus 1. This means that the angle of view of the lenses 22 through 24 and the amount of incoming light thereinto do not vary in the image pickup apparatus 1. Here, the shutter opening 38 of the blade substrate 31 is fit with the lens holder 21, and does not practically serve as an opening for image taking in the image pickup apparatus 1. An opening 32HL formed on the blade supporting plate 32 corresponds to the opening for image taking in the image pickup apparatus 1, as described.

Figure 2:
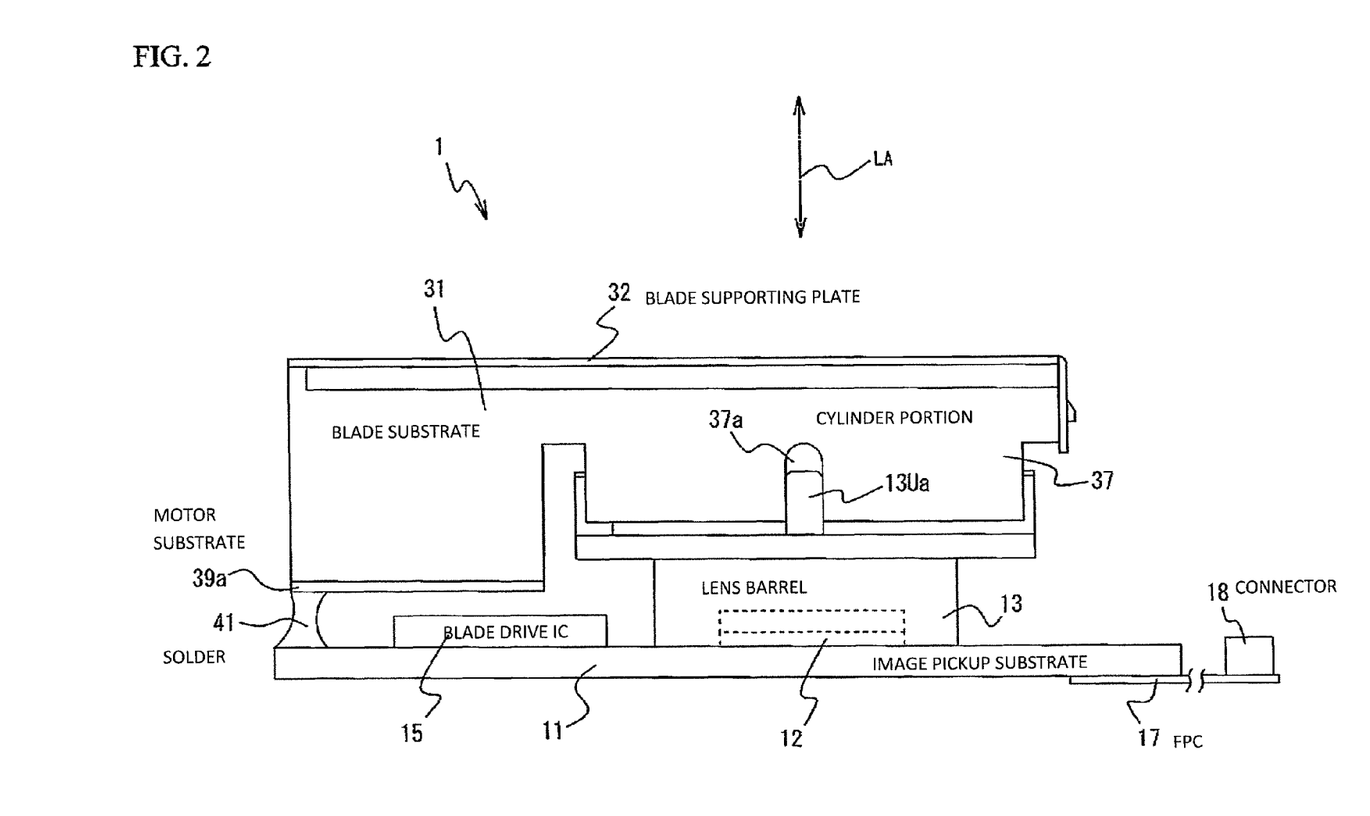
FIG. 2 is a view illustrating a relationship of engagement between a cylinder portion of a blade substrate and an upper portion of a lens barrel.

A positioning mechanism is provided between the cylinder portion 37 of the blade substrate 31 and the upper portion 13U of the lens barrel 13. FIG. 2 is a view illustrating the relationship of engagement between the cylinder portion 37 of the blade substrate 31 and the upper portion 13U of the lens barrel 13. FIG. 2 particularly shows the relation of an inner surface of the cylinder portion 37 and a protruding portion 13Ua formed at the upper portion 13U of the lens barrel 13. In other words, the protruding portion 13Ua is provided to protrude in a radius direction on the surface of the outer circumference in the upper portion 13U of the lens barrel 13. The protruding portion 13Ua extends in the optical axis direction LA with a given length. Only one protruding portion 13Ua is shown in FIG. 2, yet multiple protruding portions 13Ua may be provided on the outer circumference in the upper portion 13U, because the upper portion 13U of the lens barrel 13 has a shape of tube. On the other hand, a dent portion 37a is provided on the cylinder portion 37 of the blade substrate 31 to engage with the aforementioned protruding portion 13Ua. In this manner, the positioning mechanism is capable of positioning the blade substrate 31 of the blade drive unit 30 so as not to rotate around the optical axis of the lenses 22 through 24. In this manner, the blade drive unit 30 is provided in the optical unit 20 with being spaced apart from the image pickup substrate 11.

The example shown in FIG. 2 includes the protruding portion provided in the upper portion 13U of the lens barrel 13 and the dent portion provided in the cylinder portion 37 of the blade substrate 31. However, the protruding portion may be provided in the cylinder portion 37 of the blade substrate 31 and the dent portion may be provided in the upper portion 13U of the lens barrel 13. That is to say, an engagement portion may be provided to engage the lens barrel 13 and the cylinder portion 37 of the blade substrate 31 so that the engagement portion can limit the position relative to the optical axis of the lenses 22 through 24 in the cylinder portion 37. Here, the inner surface of the cylinder portion 37 is formed to rightly fit with the upper portion 13U of the lens barrel 13.

After positioning the dent portion 37a of the cylinder portion 37 of the blade substrate 31 relative to the protruding portion 13Ua of the lens barrel 13, as mentioned above, the blade substrate 31 can be fixed onto the lens barrel 13 accurately by applying the adhesive agent on the engagement portion. As seen in FIG. 1, the upper portion 13U of the lens barrel 13 is covered with the cylinder portion 37 of the blade substrate 31 in this configuration. The cylinder portion 37 of the blade substrate 31 is spaced apart from the lens barrel 13 by a predetermined distance. This configuration is capable of preventing undesired lights from coming into the lens barrel 13 from sides of the image pickup apparatus 1.

Further, a motor substrate 39a is jointed to the side, near the image pickup substrate 11, of the blade substrate 31, and the motor substrate 39a connects electrodes of the step motor 36 to the image pickup substrate 11 and supplies the step motor 36 with a drive power. That is to say, the motor substrate 39a is stably held by the blade substrate 31, composed of the blade drive unit 30, via a broad contact area of the whole surface of the motor substrate 39a, so as to face the image pickup substrate 11. The motor substrate 39a is disposed to be held within a clearance between the image pickup substrate 11 and the blade substrate 31. The base material of this motor substrate 39a is made of a polyimide resin or the like, and the motor substrate 39a is a flexible printed circuit which is bendable and flexible.

Further, a solder 41 is formed between the image pickup substrate 11 and the motor substrate 39a so as to electrically connect therebetween. The solder 41 is formed at positions corresponding to lands for electrically connecting the image pickup substrate 11 with the motor substrate 39a. The solder 41 is mutually applied to the lands. This assures the electrical connection of the image pickup substrate 11 and the motor substrate 39a.

In this manner, the motor substrate 39a is in contact with the blade drive unit 30 via the broad contact area of the whole surface of the motor substrate 39a and is stably held. Then, the solder 41 which electrically connects the image pickup substrate 11 with the motor substrate 39a is disposed between the image pickup substrate 11 and the motor substrate 39a. This provides the structure in which the solder 41 is hardly affected by stress concentration from an edge of the motor substrate 39a in the optical axis direction. That is to say, since boundary faces of the motor substrate 39a and the solder 41 are perpendicular to the optical axis, the boundary faces serve to cushion a load applied in the optical axis direction. This suppresses the shear stress generated between the motor substrate 39a and the solder 41 and between the solder 41 and the image pickup substrate 11. This prevents the electrical disconnection of the motor substrate 39a and the image pickup substrate 11 via the solder 41, and maintains the electrical connection.

The solder 41 is disposed between the image pickup substrate 11 and the motor substrate 39a, thereby downsizing a space for disposing the solder 41 and effectively using the clearance between the blade drive unit 30 and the image pickup substrate 11. Additionally, the contact area of the solder 41 is increased without increasing the outer size of the image pickup apparatus 1, thereby securely maintaining the electrical connection. Thus, the impact resistance can be enhanced and the image pickup substrate 11 can be downsized. Therefore, the whole of the image pickup apparatus 1 can be downsized. In addition, since the motor substrate 39a is stably held by the blade drive unit 30 via the broad contact area, similar good impact resistance can be obtained by using either of a hard substrate having a rigidity or a soft substrate having flexibility. Thus, the design flexibility can be increased, because any kind of material is employed for the motor substrate.

Additionally, in the motor substrate 39a and the image pickup substrate 11, the solder 41 is provided on the opposite side of the side at which the lens barrel 13 is disposed. This solder 41 electrically connects the motor substrate 39a and the image pickup substrate 11. The blade drive unit 30 is securely supported by the image pickup substrate 11 via the motor substrate 39a which is a soft FPC print substrate having flexibility. Moreover, the blade drive unit 30 is fixed onto the image pickup substrate 11 on the side of the cylinder portion 37 via the lens holder 21 and the lens barrel 13, as described above. In this manner, the blade drive unit 30 is stably supported by the image pickup substrate 11 via the motor substrate 39a and the solder 41. Hence, the image pickup apparatus 1 is excellent in the impact resistance, and is capable of reducing the load occurred therein.

The motor substrate 39a is connected to the image pickup substrate 11 in the image pickup apparatus 1, as described. This makes it possible to control the step motor 36 with the image pickup substrate 11. With this configuration, electronics parts for the motor can be provided on the image pickup substrate 11, although the electronics parts for the motor usually should be provided on the blade drive unit 30. In this manner, there is the space in the image pickup substrate 11, and so the aforementioned space is utilized to downsize the image pickup apparatus 1 as a whole. Such downsizing is not limited to the image pickup apparatus 1. For example, a blade drive IC (control circuit element), which is provided to control driving of the blade, has a relatively large size. So, if the blade drive IC is mounted on the motherboard of the electronics apparatus, the whole apparatus becomes larger in size. The image pickup apparatus 1 is configured to provide a blade drive IC 15 in the image pickup substrate 11 with the best use of space. Thus, the electronics apparatus that mounts the image pickup apparatus 1 thereon can be downsized.

The image pickup apparatus 1 embodying the present invention is configured not to grow in size, even if the blade drive IC 15 is provided on the image pickup substrate 11. To be more detail, referring back to FIG. 1, the right side in FIG. 1 is relatively high, because the lens barrel 13 and the lens holder 21 are piled up on the right side of the image pickup apparatus 1. On the other hand, there is more space in a region facing the motor housing portion 39 in the image pickup substrate 11. The blade drive IC 15 is provided in the aforementioned region. The member used for the blade drive unit 30 is provided on or above the image pickup substrate 11, and this does not grow the whole apparatus in size. Thus, the whole apparatus can be downsized by utilizing the space effectively.

The FPC 17 is connected to the image pickup substrate 11 for connecting the electronics apparatus, as described, and a connector 18 is provided on the FPC 17 in order to connect the circuit board such as a motherboard provided on the electronics apparatus. The image pickup unit 10 and the blade drive unit 30 can be controlled only by connecting the connector 18 and the motherboard of the electronics apparatus. The image pickup apparatus 1 is capable of simplifying the electric configuration as compared to the conventional method of separately controlling the blade drive unit 30 and the image pickup optical module.

Figure 3:
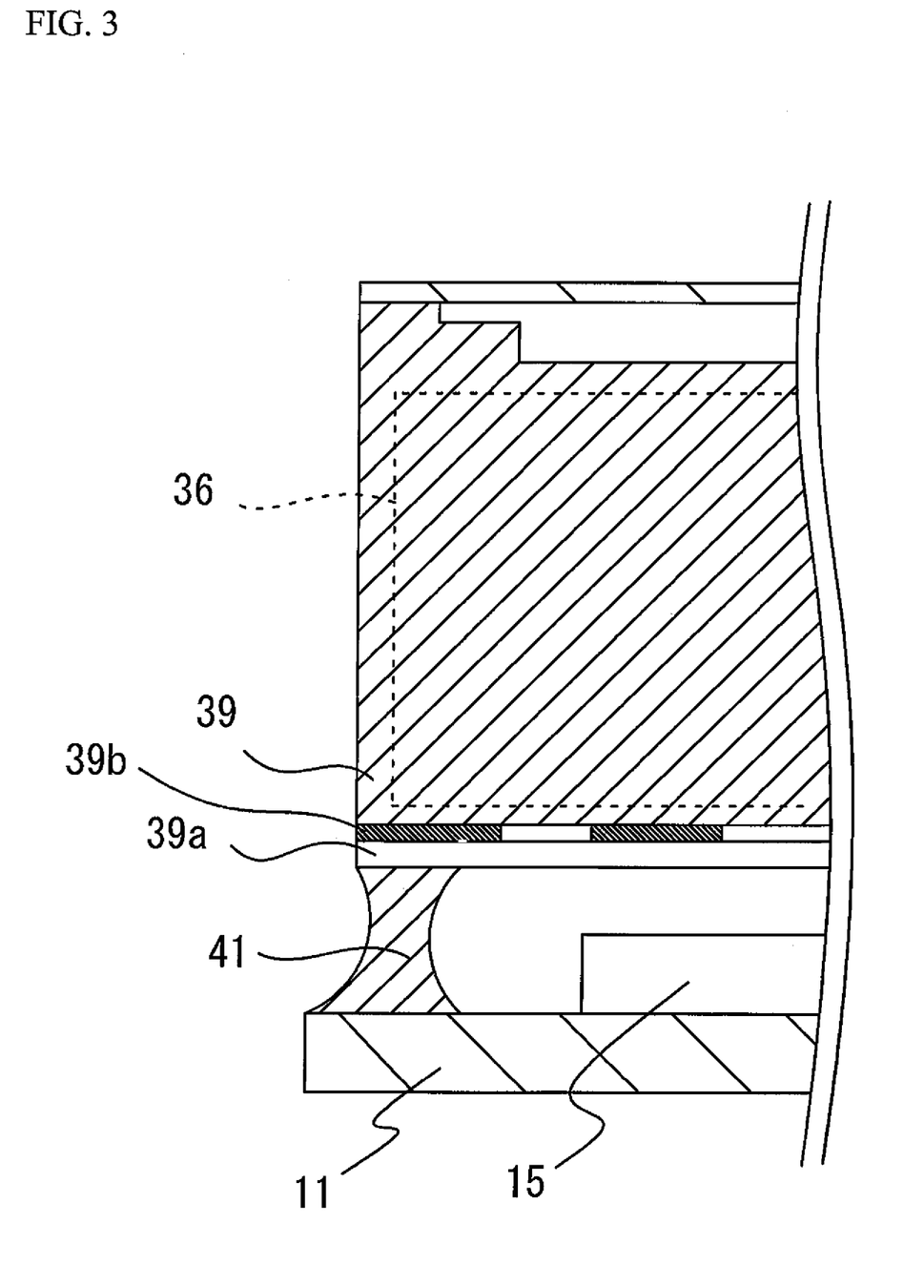
FIG. 3 is an enlarged view showing a circumference of a motor substrate shown in FIG. 1.

FIG. 3 is an enlarged view showing a circumference of the motor substrate 39a shown in FIG. 1.

The motor substrate 39a is jointed to the side, closer to the image pickup device 12, of the blade substrate 31 with the double-sided tape 39b having an elasticity. This double-sided tape 39b serves as a cushioning member which cushions an impact. Therefore, the impact on the motor substrate 39a can be reduced, and the impact on the solder 41 via the motor substrate 39a can be reduced. Consequently, the impact resistance can be improved.

Further, in order to assure the connection of the motor substrate 39a with wires of the step motor 36, the double-sided tapes 39b are applied at a predetermined interval. That is to say, the wires of the step motor 36 pass through the position to which the double-sided tape 39b is not attached, and the wires are connected to the motor substrate 39a.

In addition, the double-sided tape 39b has a foam structure so as to have elasticity. The double-sided tape 39b having a thickness, including an adhesive layer, of about 0.1 mm can be employed.

Figure 4:
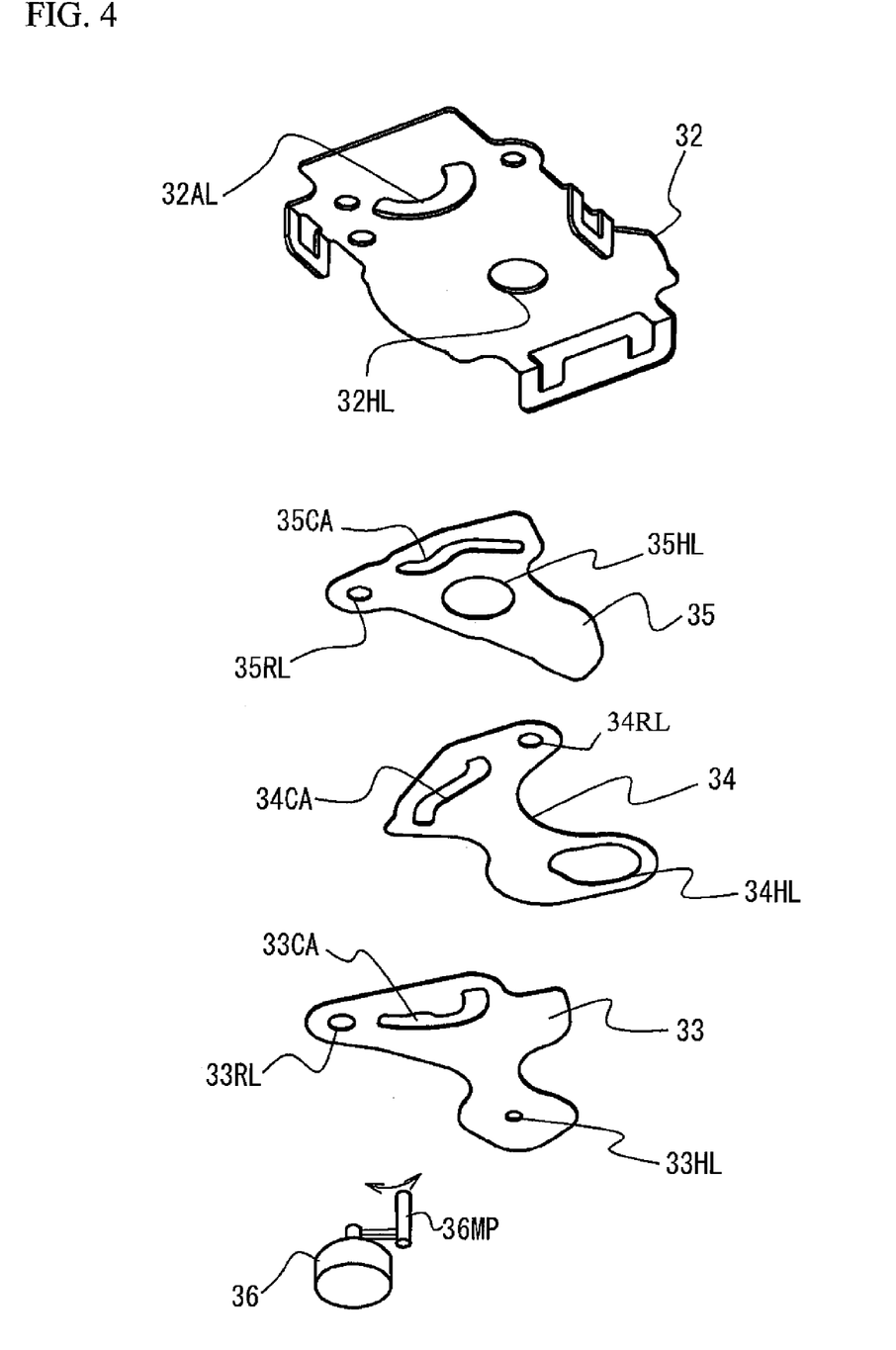
FIG. 4 is a perspective view showing three pieces of blades and a blade supporting plate shown in FIG. 1, the blades being provided in a blade arrangement space between the blade substrate and the blade supporting plate.

FIG. 4 is a perspective view showing three pieces of the blades 33, 34, and 35 and the blade supporting plate 32 shown in FIG. 1, the blades 33, 34, and 35 being provided in the blade arrangement space SP between the blade substrate 31 and the blade supporting plate 32. The blades 33, 34, and 35 respectively include bearing holes 33RL, 34RL, and 35RL fit with a spindle, not shown, provided on the blade substrate 31. The blades 33, 34, and 35 rotate around the spindle. Also, cam holes 33CA, 34CA, and 35CA are respectively provided in the blades 33, 34, and 35. An actuating pin 36MP fixed onto the step motor 36 is engaged with all the cam holes. As the actuating pin 36MP moves in a given range due to the rotation of the step motor 36, the blades 33, 34, and 35 respectively rotate and draw trajectories according to the shape of the cam holes.

The blade 33 is a small aperture blade having a small aperture hole 33HL. The blade 34 is provided to prevent hitting of the blades 33 and 35. The blade 34 is configured to contact both the blades 33 and 35 all the time to prevent the hitting. The blade 34 includes an opening 34HL having a large diameter so as not to disturb image taking, even if the blade 34 is provided near the shutter opening 38. On the other hand, the blade 35 is a shutter blade. An opening 35HL is provided in the blade 35 in order to reduce the weight. The blade supporting plate 32 includes an opening 32AL having a shape of arc and an opening 32HL. The opening 32AL is provided for the movement of the actuating pin 36MP. The opening 32HL used for image taking is arranged in a position corresponding to the shutter opening 38 of the blade substrate 31.

Referring to FIG. 1 again, a description will be given of a manufacturing method of the image pickup apparatus 1. The image pickup device 12 is mounted on a given position of the image pickup substrate 11 of the image pickup unit 10. The optical filter 14 is bonded in the lower portion 13L of the lens barrel 13 to securely fix the lens barrel 13 onto the image pickup substrate 11. The image pickup unit 10 is produced in this manner. The lens holder 21 retaining three lenses is screwed into the lens barrel 13 for focus adjustment, and an adhesive agent is applied to securely fix the screwed portion after the focus adjustment. Here, the optical unit 20 is fixed onto the image pickup unit 10 and the image pickup optical module is thus completed.

The blades 33, 34, and 35 are sandwiched between the blade substrate 31 and the blade supporting plate 32 to securely fix the blade substrate 31 and the blade supporting plate 32. The step motor 36 is housed in the motor housing portion 39 of the blade substrate 31. The motor substrate 39a for the motor is bonded with one end of the blade substrate 31. In this manner, the blade drive unit 30 is completed. Then, the blade drive unit 30 is fixed onto the image pickup optical module.

More specifically, the dent portion 37a provided on the cylinder portion 37 is fit with the protruding portion 13Ua of the lens barrel 13, and at the same time, the shutter opening 38 is fit with the cut out portion 25 in the lens holder 21. In this manner, multiple places are positioned, ensuring accurate arrangement of the blade drive unit 30 on the image pickup optical module. The adhesive agent is applied to securely fix a fit portion in which the dent portion 37a of the cylinder portion 37 is fit with the protruding portion 13Ua of the lens barrel 13. In the end, the motor substrate 39a bonded to the blade substrate 31 is soldered with the image pickup substrate 11 of the image pickup unit 10 by a wire solder. The image pickup apparatus 1, excellent in the impact resistance, is completed.

Figure 5A:
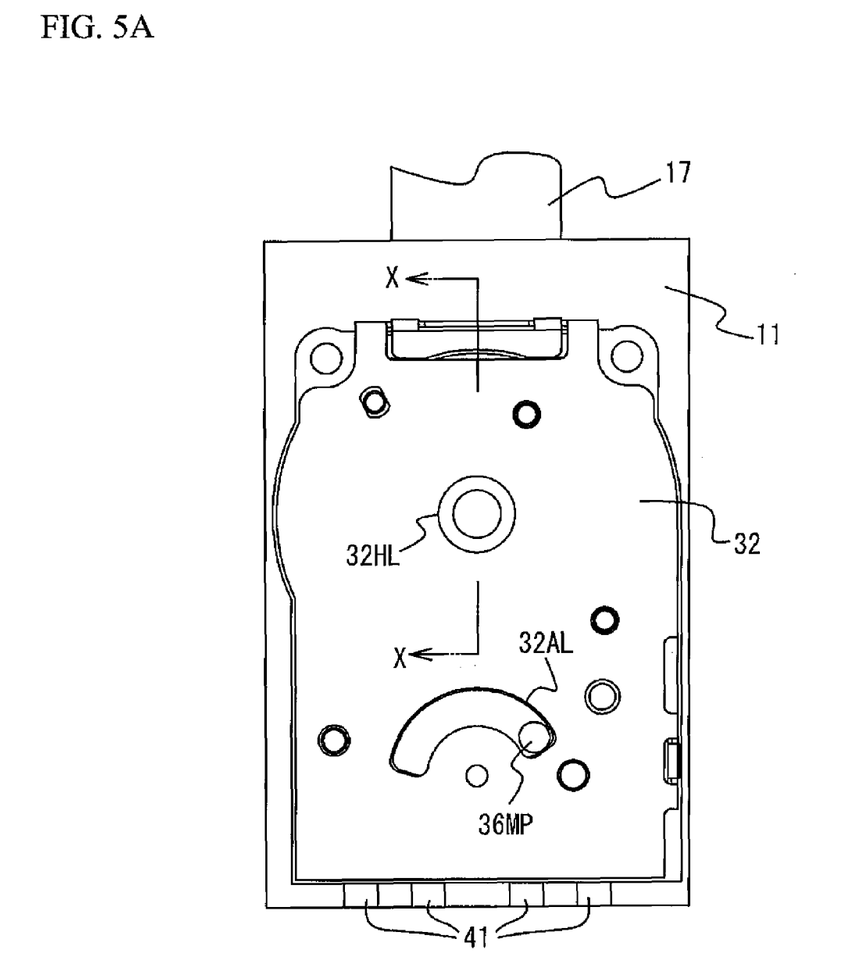
FIG. 5A is a plan view of the image pickup apparatus when viewed from the blade supporting plate.
Figure 5B:
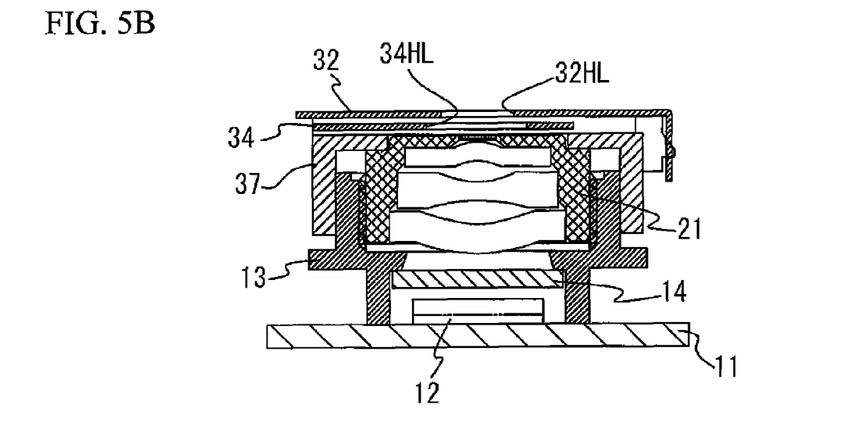
FIG. 5B is a cross-sectional view taken along a line X-X shown in FIG. 5A.
Figure 6A:
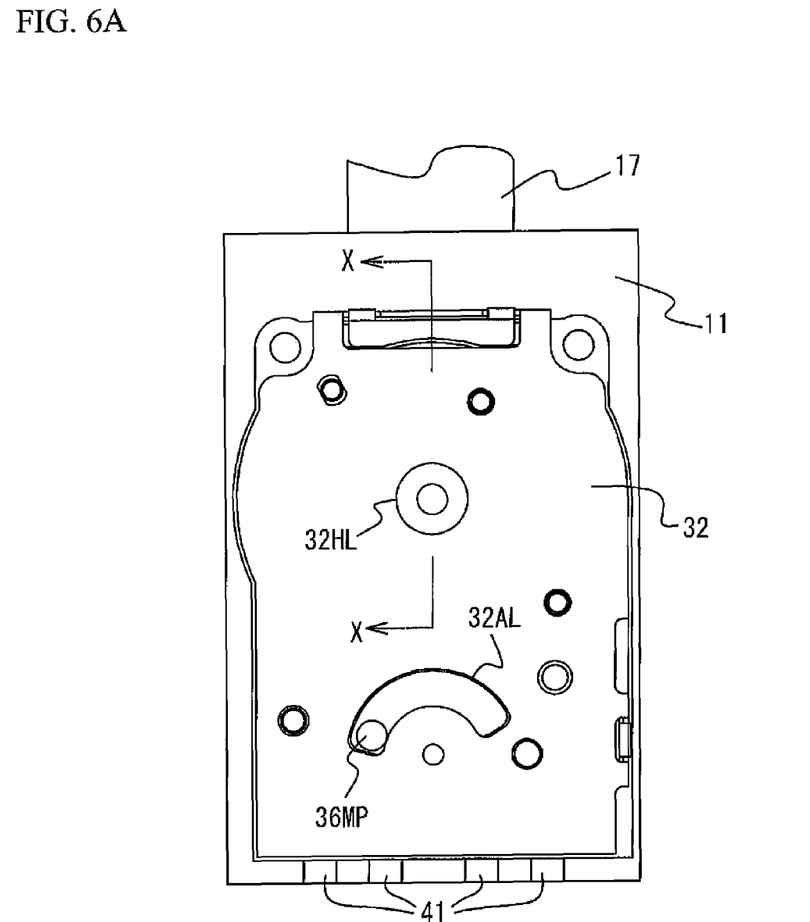
FIG. 6A is plan view of the image pickup apparatus when viewed from the blade supporting plate.
Figure 6B:
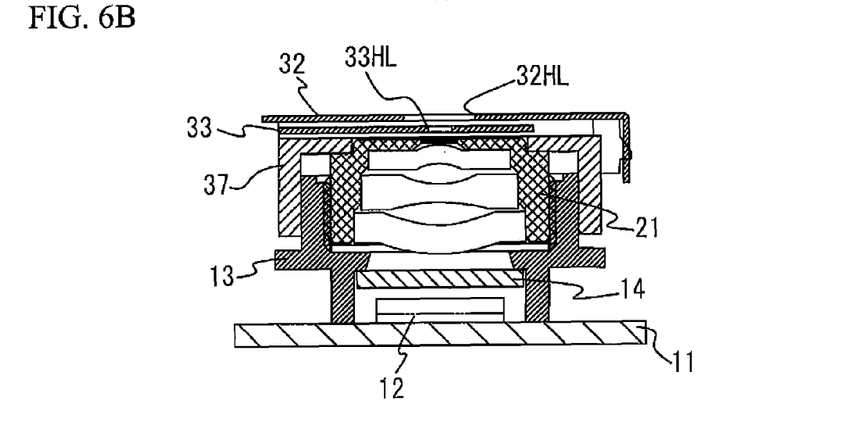
FIG. 6B is a cross-sectional view taken along a line X-X shown in FIG. 6A.

FIGS. 5A and 5B are views showing the image pickup apparatus 1 when the blades are fully opened. FIGS. 6A and 6B are views showing the image pickup apparatus 1 when the blades are in small aperture. FIGS. 5A and 6A are plan views of the image pickup apparatus when viewed from the blade supporting plate 32. FIG. 5B is a cross-sectional view taken along a line X-x shown in FIG. 5A and FIG. 6B is a cross-sectional view taken along a line X-X shown in FIG. 6A. FIGS. 5B and 6B show only the blade near the opening 32HL of the blade supporting plate 32.

In a full open state shown in FIGS. 5A and 5B, the actuating pin 36MP moved by the step motor 36 comes to a right end of the opening 32AL having a shape of arc provided in the blade supporting plate 32. In this state, the blades 33 and 35 come to recede from the opening 32HL, and the blade 34 provided therebetween comes to a position facing the opening 32HL. The blade 34 has the opening 34HL having a large diameter, and is capable of supporting the full open state readily, as shown in FIG. 4.

In a small aperture state shown in FIGS. 6A and 6B, the actuating pin 36MP moved by the step motor 36 comes to a left end of the opening 32AL having a shape of arc of the blade supporting plate 32. In this state, the blade 35 comes to recede from the opening 32HL, and the blade 33 having the small aperture hole and the blade 34 come to the position facing the opening 32HL (see FIG. 4). FIG. 6B shows only the blade 33. A full close state is formed when the actuating pin 36MP substantially comes to a central point of the opening 32AL having a shape of arc of the blade supporting plate 32, and all the blades come to the position facing the opening 32HL, although this is not shown.

The image pickup apparatus 1 is capable of taking an image normally in the full open state as shown in FIGS. 5A and 5B. The small aperture state shown in FIGS. 6A and 6B enables macro photography. The depth of field becomes deep in the small aperture state of the opening, ensuring the macro photography without moving the lens.

(Second Embodiment)

Figure 7:
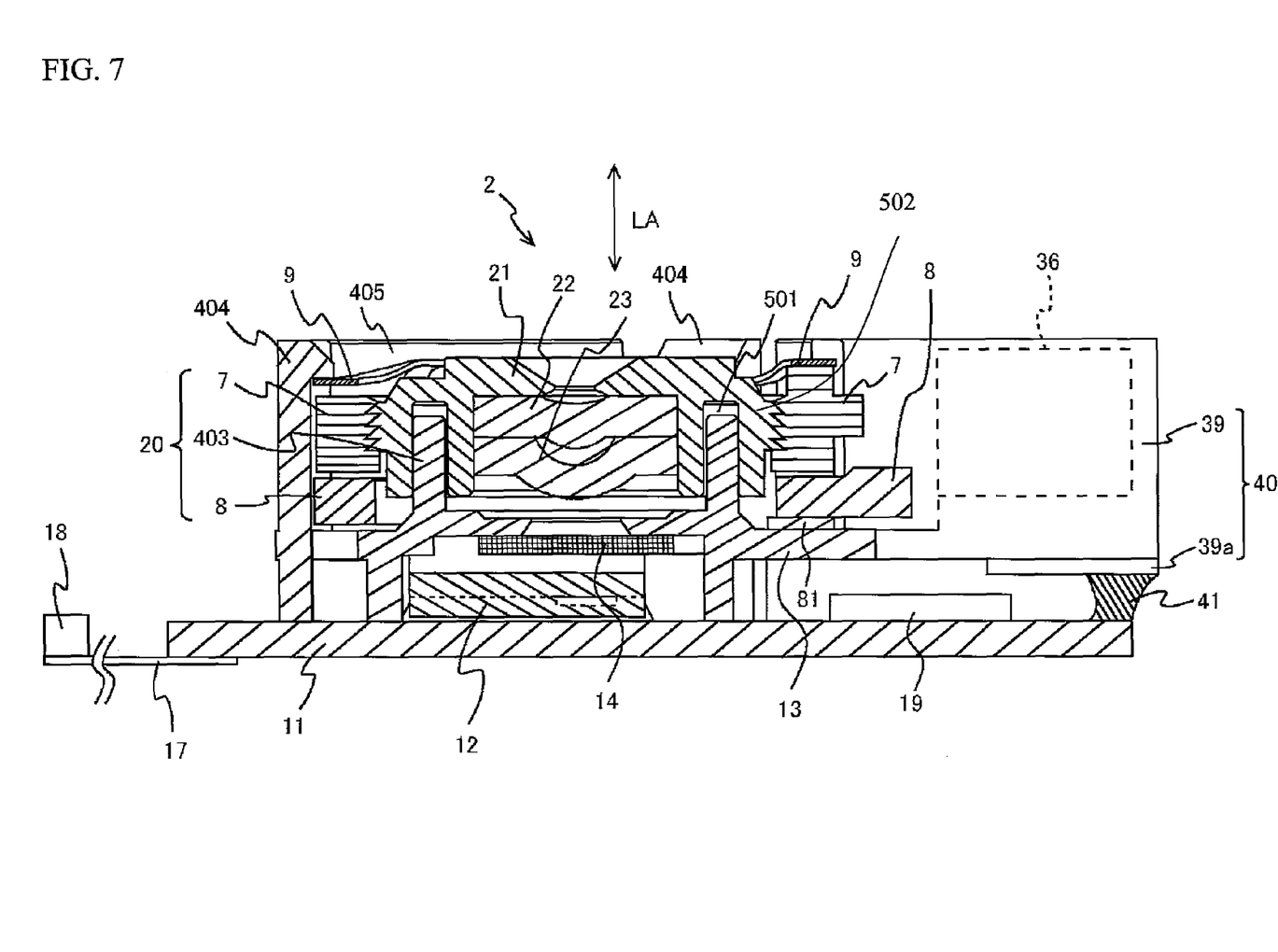
FIG. 7 is a side view of an image pickup apparatus according to the second embodiment to show the inside thereof.

Next, a description will be given of a second embodiment of the present invention with reference to FIG. 7. FIG. 7 is a side view of an image pickup apparatus 2 according to the second embodiment to show the inside thereof.

The image pickup apparatus 2 includes three substantial units, as with the first embodiment. That is to say, the image pickup apparatus 2 includes the image pickup unit 10, the optical unit 20 including the lens, and the lens drive unit 40 driving the lens holder 21.

The image pickup unit 10 includes the image pickup substrate 11, the image pickup device 12, and the optical filter 14. The image pickup device 12 is an image sensor such as a CCD, CMOS, or the like, and is fixed onto a given position of the image pickup substrate 11. The lens barrel 13 serving as a part of the optical unit 20 is substantially tube-shaped, and is fixed onto the image pickup substrate 11 to surround an outer circumference of the image pickup device 12. The optical filter 14, such as an IR cut filler, is disposed in the lens barrel 13. Additionally, in the image pickup apparatus 2, a lens drive IC 19 installed in a spatially sufficient space on the image pickup substrate 11 facing the motor housing portion 39, as with the first embodiment. Additionally, the FPC 17 is connected to a wiring pattern (not shown) formed on the image pickup substrate 11, and the FPC 17 is provided for connecting the image pickup apparatus 2 to a camera, a mobile phone, or the like. Further, the FPC 17 is provided with the connector 18 which is connected to a main circuit substrate of an electronic equipment side.

A inside cylindrical portion 403 which engages with the lens holder 21 is formed at an upper portion of the lens barrel 13 (at the opposite side of the contact portion of the lens barrel 13 with the image pickup substrate 11). In the lens barrel 13, a pole portion 404 and a wall portion 405 are provided to surround the inside cylindrical portion 403 and the lens holder 21. These portions function to increase the strength of the image pickup apparatus 2 and to protect the lenses 22 and 23, and the image pickup device 12 from an external force. The lenses 22 and 23 for imaging the objective image on the image pickup device 12 are held within the lens holder 21. The lens holder 21 has a circumferential groove 501 engaging with the inside cylindrical portion 403 of the above lens barrel 13, so that the circumferential groove 501 is fitted onto the inside cylindrical portion 403. In this manner, the lens barrel 13 and the lens holder 21 serving as the optical unit 20 are provided on the image pickup substrate 11.

Further, an adjust member 7 is provided at the outer periphery of the lens holder 21 having a cylindrical shape. The adjust member 7 has a screw portion screwing with a screw portion 502 formed in the lens holder 21. After the lens holder 21 is attached to the adjust member 7 by screwing the screw portions, the lens holder 21 is rotated about the optical axis, so that the focus adjustment of the lenses 22 and 23 is performed. After the focus adjustment of the lenses 22 and 23, an adhesive is applied to the screw portions of the adjust member 7 with the lens holder 21, and the lens holder 21 is securely fixed to the adjust member 7. Additionally, the adjust member 7 fixed to the lens holder 21 serves as a part of the lens holder 21. Additionally, the fixation of the lens holder 21 with the adjust member 7 is not limited to the adhesive, and laser welding or the like may be employed.

A rotation member 8 is disposed between the adjust member 7 and the lens barrel 13, and these members are biased by the biasing member 9 having a round shape. A gear portion, not shown, is partially formed at the outer periphery of the rotation member 8 having a ring shape, and the gear portion transmits the driving force from the lens drive unit 40. Additionally, a cam surface 81 is formed in the lower surface of the rotation member 8, and the cam surface 81 transmits the driving force causing the lens holder 21 to reciprocate in the optical axis direction LA. The rotation member 8 having the cam surface 81 is rotated about the optical axis by the driving force from the lens drive unit 40, so that the adjust member 7 above the rotation member 8 and the lens holder 21 fixed on the adjust member 7 are moved in the optical axis direction LA.

The lens drive unit 40 is provided at an end of the lens barrel 13 serving as a part of the optical unit 20 with spaced apart from the image pickup substrate 11. The lens drive unit 40 permits the rotation member 8 to rotate, and the lens drive unit 40 has the step motor 36 for moving the lens holder 21 in the optical axis direction.

Here, a brief description will be given of the mechanism which moves the lens holder 21 in the optical axis direction LA. A gear portion, not shown, is provided at a part of the peripheral portion of the ring shaped rotation member 8. An output gear, not shown, outputs the driving force from the step motor 36 of the lens drive unit 40. The gear portion and the output gear are meshed with each other, thereby rotating the rotation member 8 about the optical axis. The cam surface 81 is provided on the lower surface of the rotation member 8, and is in contact with the lens barrel 13. The droving force for moving the lens holder 21 in the optical axis direction is generated by rotating the cam surface 81 about the optical axis, so that the adjust member 7 on the rotation member 8 and the lens holder 21 fixed on the adjust member 7 are moved in the optical axis direction LA.

Also, the motor substrate 39a is jointed to the side of the image pickup substrate 11 of the lens drive unit 40. The motor substrate 39a connects the electrodes of the step motor 36 with the image pickup substrate 11 to supply the step motor 36 with a drive power. That is, the motor substrate 39a is stably held by the lens drive unit 40 so as to face the image pickup substrate 11 at a broad contact area defined by the entire surface of the motor substrate 39a. This motor substrate 39a is a FPC print substrate, in which the base material is made of a polyimide resin or the like, and which is soft and flexible.

In addition, the solder 41 is formed between the image pickup substrate 11 and the motor substrate 39a, and electrically connects therebetween. This ensures the electrical connection between the image pickup substrate 11 and the motor substrate 39a.

As mentioned heretofore, in the lens drive unit 40 according to the second embodiment, the motor substrate 39a faces the image pickup substrate 11 and is stably held by the lens drive unit 40 at the broad contact area of the entire surface of the motor substrate 39a. Then, the solder 41 which electrically connects the image pickup substrate 11 with the motor substrate 39a is disposed between the image pickup substrate 11 and the motor substrate 39a. This provides the structure in which the solder 41 is rarely affected by the concentration of stress from the end portion of the motor substrate 39a in the optical axis direction, when the impact is applied. That is, the boundary faces of the motor substrate 39a and the solder 41 are perpendicular to the optical axis. Thus, the solder 41 serves to cushion the load in the optical axis direction at the boundary face thereof, even when the load is applied in the optical axis direction. This prevents the shear stresses between the motor substrate 39a and the solder 41 and that between the solder 41 and the image pickup substrate 11.

Therefore, the connection between the motor substrate 39a and the image pickup substrate 11 by means of the solder 41 is not disconnected, so the electrical connection can be maintained.

Since the solder 41 is disposed between the image pickup substrate 11 and the motor substrate 39a, the space in which the solder 41 is disposed can be suppressed and the gap between the lens drive unit 40 and the image pickup substrate 11 can be effectively used. In addition, the area of the solder 41 can be increased without increasing the overall size of the image pickup apparatus 2, so that the electrical connection can be securely maintained. This improves the impact resistance and also reduces the image pickup substrate 11 in size; therefore, the entire image pickup apparatus 2 can be reduced in size. Further, since the motor substrate 39a is stably held by the lens drive unit 40 via the broad contact area, similar a good impact resistance can be obtained in a similar manner by using either a hard substrate having a rigidity or a soft substrate having a flexibility. Thus, a material type of the motor substrate is indifferent, so that its design flexibility can be increased.

Figure 8:
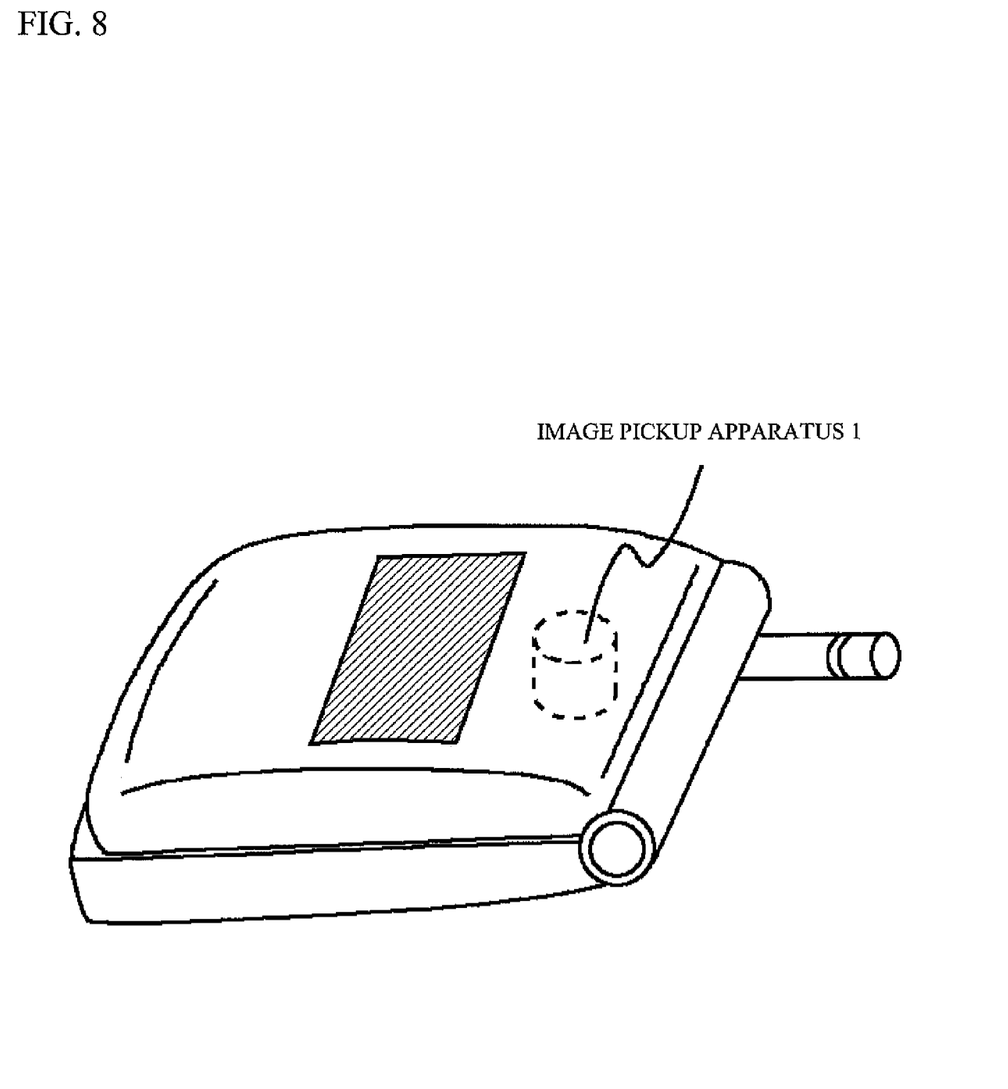
FIG. 8 shows the image pickup apparatus mounted on a mobile telephone.

FIG. 8 shows the image pickup apparatus 1 mounted on a mobile telephone. When the image pickup apparatus 1 is mounted on a mobile telephone or the like, the image pickup apparatus 1 may be covered with a cover member to strengthen the impact resistance.

Figure 9:
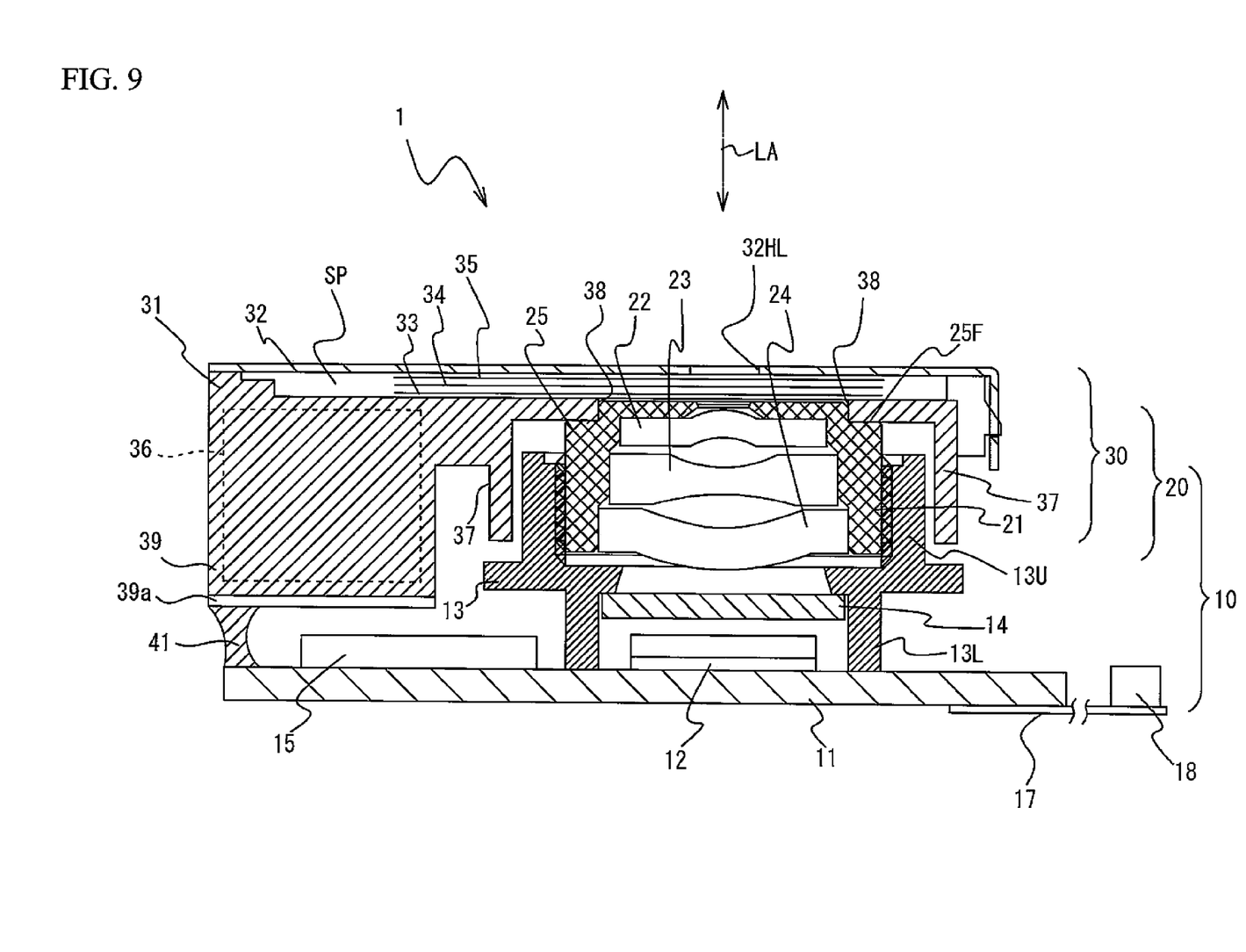
FIG. 9 is a side view of an image pickup apparatus, according to another embodiment, to show the inside thereof.

FIG. 9 shows the image pickup apparatus 1 further downsized. The image pickup substrate 11 dose not protrude from the motor housing portion 39 in the longitudinal direction of the image pickup substrate 11, so that the image pickup substrate 11 can be made smaller in the longitudinal length thereof than the image pickup apparatus 1 mentioned above.

The present invention is not limited to the above-mentioned embodiment, and other embodiments, variations and modifications may be made without departing from the scope of the present invention.

Additionally, in the second embodiment mentioned above, the lenses 22, 23, 24 are held by the lens holder 21 and are movable in the optical axis direction. However, the present invention is not limited to the above configuration. For example, an optical unit and a drive unit may be employed, the optical unit including a lens holder holding a lens for movement in the direction perpendicular to the optical axis, the drive unit including: a motor serving as a drive source moving the optical unit in the direction perpendicular to the optical axis; and a motor substrate supplying the motor with a drive power from an image pickup substrate.

Additionally, in the first and second embodiments, as an example, the drive unit having the step motor has been described. However, the present invention is not limited to this configuration, for example, a rotary motor rotating in a predetermined range may be employed.

Further, in the first and second embodiments, the solder is used as the conductive member electrically connecting the motor substrate 39a with the image pickup substrate 11. However, the present invention is not limited to this configuration; for example, a connector or a pin connection may connect the motor substrate 39a with the image pickup substrate 11.

Furthermore, in the above embodiments, the motor substrate 39a is held by the blade drive unit 30 via the double-sided tape 39b which serves as a cushioning member having elasticity and cushioning impact. However, the cushioning member may be any other type than the double-sided tape, for example, a rubber adhesive having elasticity may be employed.

Finally, several aspects of the present invention are summarized as follows.

According to an aspect of the present invention, there is provided an image pickup apparatus comprising: an image pickup substrate on which an image pickup device is mounted on an object side; an optical unit having a lens for imaging an object light on the image pickup device; a blade member adjusting an amount of the object light entering into the lens; a drive unit having a motor driving the blade member; and a motor substrate supplying the motor with a drive power, wherein the optical unit is provided in the image pickup substrate, the drive unit is provided in the optical unit so as to be spaced apart from the image pickup substrate; the motor substrate is provided in the drive unit so as to face the image pickup substrate; and a conductive member electrically connecting the image pickup substrate with the motor substrate is disposed between the image pickup substrate and the motor substrate.

With such a configuration, the motor substrate is stably held by the drive unit via a broad contact area so as to face the image pickup substrate. Then, the conductive member, which electrically connects the image pickup substrate with the motor substrate, is disposed between the image pickup substrate and the motor substrate. Therefore, the conductive member, on the image pickup substrate, needed for the electric connection between the image pickup substrate and the motor substrate, is rarely affected by the concentration of stress from an end portion of the motor substrate in the optical axis direction, when the impact is applied. That is to say, since boundary faces of the motor substrate and the conductive member are perpendicular to the optical axis, the boundary faces serve to cushion a load applied in the optical axis direction. This suppresses the shear stress generated among the motor substrate, the conductive member, and the image pickup substrate. This prevents the electrical disconnection of the motor substrate and the image pickup substrate, and maintains the electrical connection. The conductive member is disposed between the image pickup substrate and the motor substrate, thereby downsizing a space for disposing the conductive member. Additionally, a contact area of the conductive member is increased without increasing the outer size of the image pickup apparatus, thereby securely maintaining the electrical connection. Thus, the impact resistance can be enhanced and the image pickup substrate can be downsized. Therefore, the whole of the image pickup apparatus can be downsized.

According to a second aspect of the present invention, there is provided an image pickup apparatus comprising: an image pickup substrate on which an image pickup device is mounted on an object side; an optical unit having a lens imaging an object light on the image pickup device; a drive unit having a motor driving the lens in a optical axis direction or in a direction perpendicular to the optical axis; and a motor substrate supplying the motor with a drive power, wherein the optical unit is provided in the image pickup substrate, the drive unit is provided in the optical unit so as to be spaced apart from the image pickup substrate; the motor substrate is provided in the drive unit so as to face the image pickup substrate; and a conductive member electrically connecting the image pickup substrate with the motor substrate is disposed between the image pickup substrate and the motor substrate.

With such a configuration, the motor substrate is stably held by the drive unit via a broad contact area so as to face the image pickup substrate. Then, the conductive member, which electrically connects the image pickup substrate with the motor substrate, is disposed between the image pickup substrate and the motor substrate. Therefore, the conductive member, on the image pickup substrate, needed for the electric connection between the image pickup substrate and the motor substrate, is rarely affected by the concentration of stress from an end portion of the motor substrate in the optical axis direction, when the impact is applied. That is to say, since boundary faces of the motor substrate and the conductive member are perpendicular to the optical axis, the boundary faces serve to cushion a load applied in the optical axis direction. This suppresses the shear stress generated among the motor substrate, the conductive member, and the image pickup substrate. This prevents the electrical disconnection of the motor substrate and the image pickup substrate, and maintains the electrical connection. The conductive member is disposed between the image pickup substrate and the motor substrate, thereby downsizing a space for disposing the conductive member. Additionally, a contact area of the conductive member is increased without increasing the outer size of the image pickup apparatus, thereby securely maintaining the electrical connection. Thus, the impact resistance can be enhanced and the image pickup substrate can be downsized. Therefore, the whole of the image pickup apparatus can be downsized.

In the above configuration, the motor substrate may be provided in the drive unit via a cushioning member cushioning an impact.

With this configuration, the impact on the motor substrate can be reduced, and the impact on the conductive member or the like via the motor substrate 39a can be reduced. Consequently, the impact resistance can be improved.

What is claimed is:

1. An image pickup apparatus, comprising:
an image pickup substrate on which an image pickup device is mounted on an object side;
an optical unit having a lens for imaging an object light on the image pickup device;
a blade member adjusting an amount of the object light entering into the lens;
a drive unit having a motor driving the blade member; and
a motor substrate supplying the motor with a drive power,
wherein the optical unit is provided in the image pickup substrate,
wherein the drive unit is provided in the optical unit so as to he spaced apart from the image pickup substrate,
wherein the motor substrate is provided in the drive unit so as to face the image pickup substrate, the motor substrate being arranged between the motor and the image pickup substrate,
wherein the image pickup substrate and the motor substrate are unbent, and
wherein a conductive member having a solder electronically connects the image pickup substrate with the motor substrate and is disposed between the image pickup substrate and the motor substrate.

2. The image pickup apparatus according to claim 1, wherein the motor substrate is provided in the drive unit via a cushioning member cushioning an impact.

3. An image pickup apparatus, comprising:
an image pickup substrate on which an image pickup device is mounted on an object side;
an optical unit having a lens imaging an object light on the image pickup device;
a drive unit having a motor driving the lens in an optical axis direction or in a direction perpendicular to the optical axis; and
a motor substrate supplying the motor with a drive power, wherein the optical unit is provided in the image pickup substrate, wherein the drive unit is provided in the optical unit so as to be spaced apart from the image pickup substrate, wherein the motor substrate is provided in the drive unit so as to face the image pickup substrate, the motor substrate being arranged between the motor and the image pickup substrate, wherein the image pickup substrate and the motor substrate are unbent, and wherein a conductive member having a solder electrically connects the image pickup substrate with the motor substrate and is disposed between the image pickup substrate and the motor substrate.

4. The image pickup apparatus according to claim 3, wherein the motor substrate is provided in the drive unit via a cushioning member cushioning an impact.

* * * * *